US012129997B2

(12) United States Patent
Hsieh

(10) Patent No.: US 12,129,997 B2
(45) Date of Patent: Oct. 29, 2024

(54) SOCKET-DRIVEN LIGHTING CONNECTOR, SOCKET-DRIVEN LIGHTING DEVICE, AND OPERATING METHOD OF SOCKET-DRIVEN LIGHTING DEVICE

(71) Applicant: KABO Tool Company, Taichung (TW)

(72) Inventor: Chih-Ching Hsieh, Taichung (TW)

(73) Assignee: KABO Tool Company, Taichung (TW)

( * ) Notice: Subject to any disclaimer, the term of this patent is extended or adjusted under 35 U.S.C. 154(b) by 110 days.

(21) Appl. No.: 18/183,797

(22) Filed: Mar. 14, 2023

(65) Prior Publication Data

US 2023/0296235 A1 Sep. 21, 2023

(30) Foreign Application Priority Data

Mar. 16, 2022 (TW) ................................. 111109707

(51) Int. Cl.

| | |
|---|---|
| ***B25B 23/18*** | (2006.01) |
| ***F21K 9/232*** | (2016.01) |
| ***F21V 23/04*** | (2006.01) |
| ***F21V 23/06*** | (2006.01) |

(52) U.S. Cl.

CPC .............. *F21V 23/06* (2013.01); *F21K 9/232* (2016.08); *F21V 23/04* (2013.01)

(58) Field of Classification Search

CPC .......... F21V 23/06; F21V 23/04; F21K 9/232; B25B 13/06; B25B 23/18; B25F 5/021

USPC .......................................................... 315/291

See application file for complete search history.

(56) References Cited

U.S. PATENT DOCUMENTS 5,477,434 A * 12/1995 Reed ................... B25B 23/0021 81/177.85
5,848,832 A * 12/1998 Hsieh ...................... B25B 23/18 362/120
5,897,198 A * 4/1999 Hsieh ...................... B25B 23/18 81/177.85
6,290,366 B1 * 9/2001 Lin ......................... B25B 23/18 362/109
6,367,944 B1 * 4/2002 Wang ...................... B25B 13/06 362/253
6,508,565 B2 * 1/2003 Wang ...................... B25B 23/18 362/120
6,527,404 B2 * 3/2003 Wang ...................... B25B 23/18 362/120
6,712,484 B2 * 3/2004 Hsien ...................... B25B 23/18 81/177.85

(Continued)

*Primary Examiner* — Ryan Jager

(74) *Attorney, Agent, or Firm* — Wang Law Firm, Inc.

(57) ABSTRACT

A socket-driven lighting connector is configured to connect with a socket and includes a connector main body, a light bulb, a switch, and a positioning ball. The connector main body includes an enclosing wall and a radial through hole. The enclosing wall surrounds and forms a through space. The radial through hole penetrates the enclosing wall and is in communication with the through space. The light bulb is disposed in the through space. The switch is provided in the through space and is electrically connected to the light bulb. The positioning ball is movably provided in the radial through hole. The switch and the positioning ball are so structured that by mounting the socket on the connector main body, the light bulb can be turned on to enhance the efficiency with which the socket can be operated in the dark.

10 Claims, 8 Drawing Sheets

(56) References Cited

U.S. PATENT DOCUMENTS

| | | | | |
|---|---|---|---|---|
| 8,425,074 | B2 * | 4/2013 | Tsai | B25B 23/18 362/120 |
| 8,465,169 | B2 * | 6/2013 | Lin | B25B 13/463 362/120 |
| 2003/0043574 | A1 * | 3/2003 | Hsien | B25B 13/463 362/119 |
| 2008/0158861 | A1 * | 7/2008 | Chiang | B25B 23/18 362/120 |
| 2011/0182058 | A1 * | 7/2011 | Tsai | B25B 23/18 362/119 |
| 2016/0052112 | A1 * | 2/2016 | Lemley, Jr. | B25B 23/18 362/119 |
| 2023/0296235 | A1 * | 9/2023 | Hsieh | B25B 23/18 315/291 |

* cited by examiner

SOCKET-DRIVEN LIGHTING CONNECTOR, SOCKET-DRIVEN LIGHTING DEVICE, AND OPERATING METHOD OF SOCKET-DRIVEN LIGHTING DEVICE

BACKGROUND OF THE INVENTION

1. Technical Field

The present disclosure relates to a lighting connector, a lighting device, and an operating method of the lighting device. More particularly, the present disclosure relates to a socket-driven lighting connector for use with a hand tool, a socket-driven lighting device, and an operating method of the socket-driven lighting device.

2. Description of Related Art

Generally, a hand tool may include a connector for connecting with a socket in order to lock a fastener in place with the socket. To facilitate the operation of such hand tools in a poorly lit environment, some manufacturers have provided the corresponding connectors with a lighting element and an external switch so that when additional lighting is needed, the lighting element can be turned on by operating the switch manually. However, a hand tool user wishing to turn on the lighting element of such a connector in the dark is often delayed by having to look for the switch on the connector. Therefore, how to make it easier for the user of a lighting device that includes a connector and a socket to turn on the lighting device in the dark has been an issue to be solved by those working in the related fields.

BRIEF SUMMARY OF THE INVENTION

The present disclosure provides a socket-driven lighting connector that includes a switch and a positioning ball. The structural design of the switch and of the positioning ball allows a socket connected to the socket-driven lighting connector to be operated efficiently in the dark.

One embodiment of the present disclosure provides a socket-driven lighting connector configured to connect with a socket. The socket-driven lighting connector includes a connector main body, a light bulb, a switch, and a positioning ball. The connector main body includes an enclosing wall and a radial through hole. The enclosing wall surrounds and forms a through space. The radial through hole penetrates the enclosing wall and is in communication with the through space. The light bulb is disposed in the through space. The switch is provided in the through space and is electrically connected to the light bulb. The positioning ball is movably provided in the radial through hole. While the socket is being mounted to the connector main body, the socket pushes the positioning ball and thereby switches the positioning ball from a first position to a second position. When at the second position, the positioning ball not only is pressed against the socket to keep the socket in place, but also presses the switch such that the light bulb is turned on. Thus, as soon as an operator mounts the socket on the socket-driven lighting connector, the light bulb is turned on to enhance the efficiency with which the socket can be operated in the dark.

The foregoing socket-driven lighting connector may further include a restoring element that is disposed in the through space and between the switch and the positioning ball.

The foregoing socket-driven lighting connector may further include a circuit board that is disposed in the through space and provided with the light bulb.

The foregoing socket-driven lighting connector may further include a battery that is disposed in the through space and provided on the circuit board.

Another embodiment of the present disclosure provides a socket-driven lighting device that includes a socket and a socket-driven lighting connector. The socket includes an encircling wall and at least one light-permeable portion. The at least one light-permeable portion is provided at the encircling wall. The socket-driven lighting connector is configured to connect with the socket and includes a connector main body, a light bulb, a switch, and a positioning ball. The connector main body includes an enclosing wall and a radial through hole. The enclosing wall surrounds and forms a through space. The radial through hole penetrates the enclosing wall and is in communication with the through space. The light bulb is disposed in the through space. The switch is provided in the through space and is electrically connected to the light bulb. The positioning ball is movably provided in the radial through hole. While the socket is being mounted to the connector main body, the socket pushes the positioning ball and thereby switches the positioning ball from a first position to a second position. When at the second position, the positioning ball not only is pressed against the socket to keep the socket in place, but also presses the switch such that the light bulb is turned on, with the light of the light bulb coming out of the socket through the at least one light-permeable portion. Thus, as soon as an operator mounts the socket on the socket-driven lighting connector, the light bulb is turned on to enhance the efficiency with which the socket can be operated in the dark.

The foregoing socket-driven lighting device may be so designed that the socket-driven lighting connector further includes a restoring element, wherein the restoring element is disposed in the through space and between the switch and the positioning ball.

The foregoing socket-driven lighting device may be so designed that the socket-driven lighting connector further includes a circuit board, wherein the circuit board is disposed in the through space and is provided with the light bulb.

The foregoing socket-driven lighting device may be so designed that the socket-driven lighting connector further includes a battery, wherein the battery is disposed in the through space and is provided on the circuit board.

Yet another embodiment of the present disclosure provides an operating method of a socket-driven lighting device. The operating method includes a socket connecting step and a triggering step. The socket connecting step involves mounting a socket on the connector main body of a socket-driven lighting connector, wherein the socket-driven lighting connector includes a positioning ball, a light bulb, and a switch. The triggering step involves pushing the positioning ball with the socket while the socket is being mounted to the connector main body, in order for the positioning ball to not only be pressed against the socket to keep the socket in place, but also press the switch and thereby cause the light bulb to emit light to enhance the efficiency with which the socket can be operated in the dark by an operator.

The foregoing operating method of a socket-driven lighting device may further include a socket removing step and a de-triggering step. The socket removing step involves removing the socket from the socket-driven lighting connector. The de-triggering step involves restoring the positioning ball to a position where no external force is applied to the positioning ball, so that the light bulb is turned off.

DETAILED DESCRIPTION OF THE INVENTION

Figure 1:
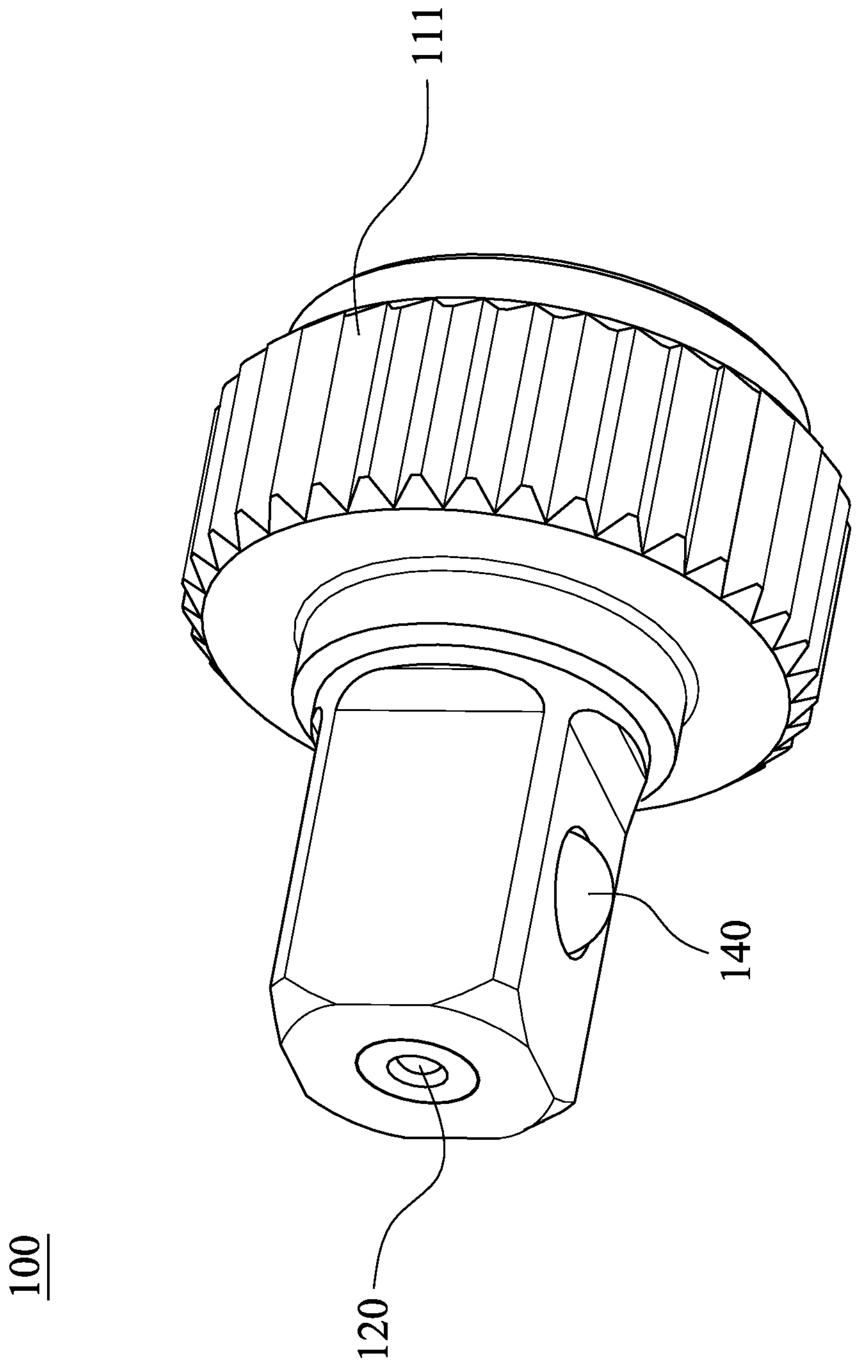
FIG. 1 is a perspective view of the socket-driven lighting connector according to an embodiment of the present disclosure.
Figure 2:
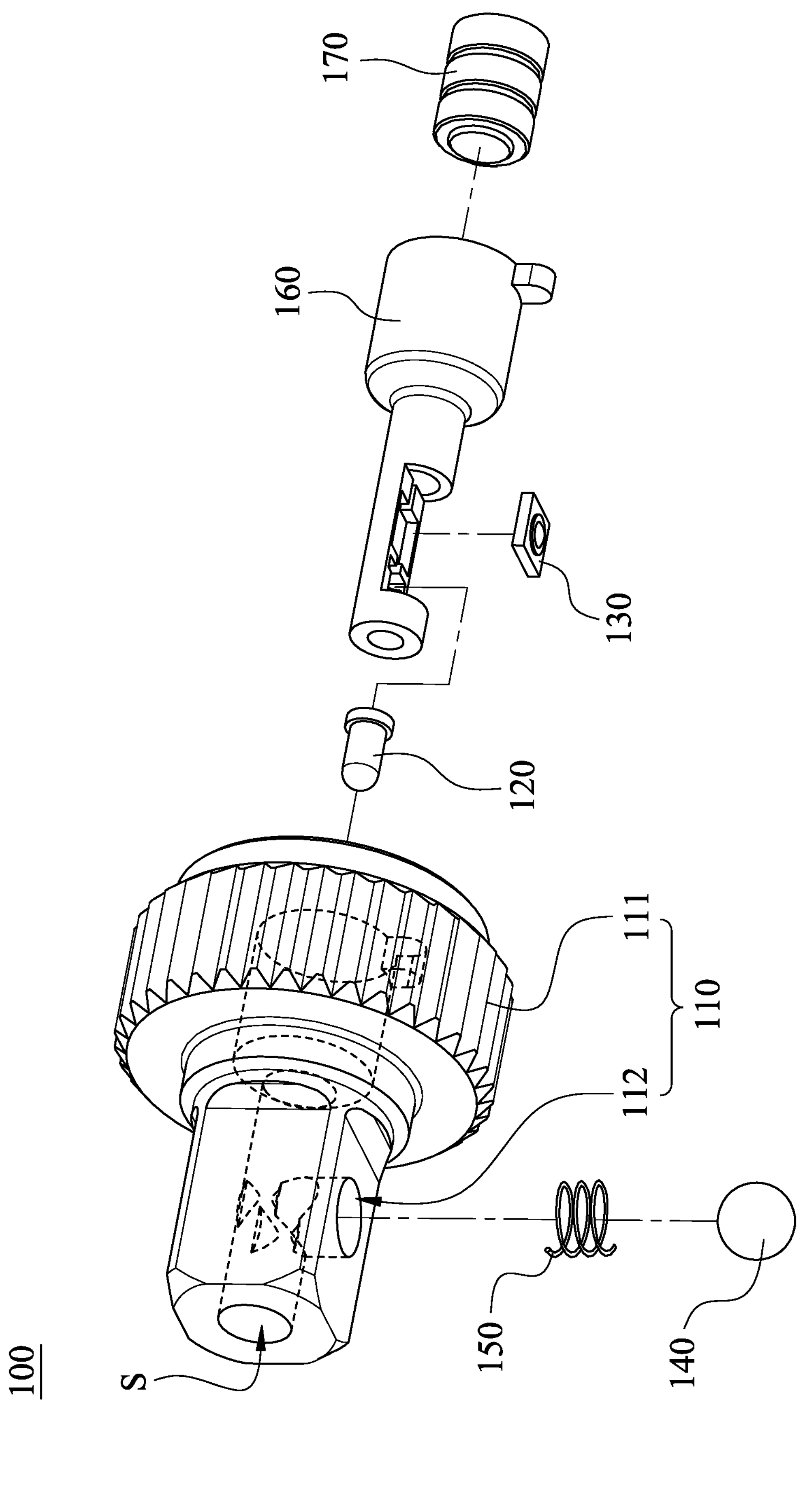
FIG. 2 is an exploded view of the socket-driven lighting connector according to the embodiment in FIG. 1.
Figure 3:
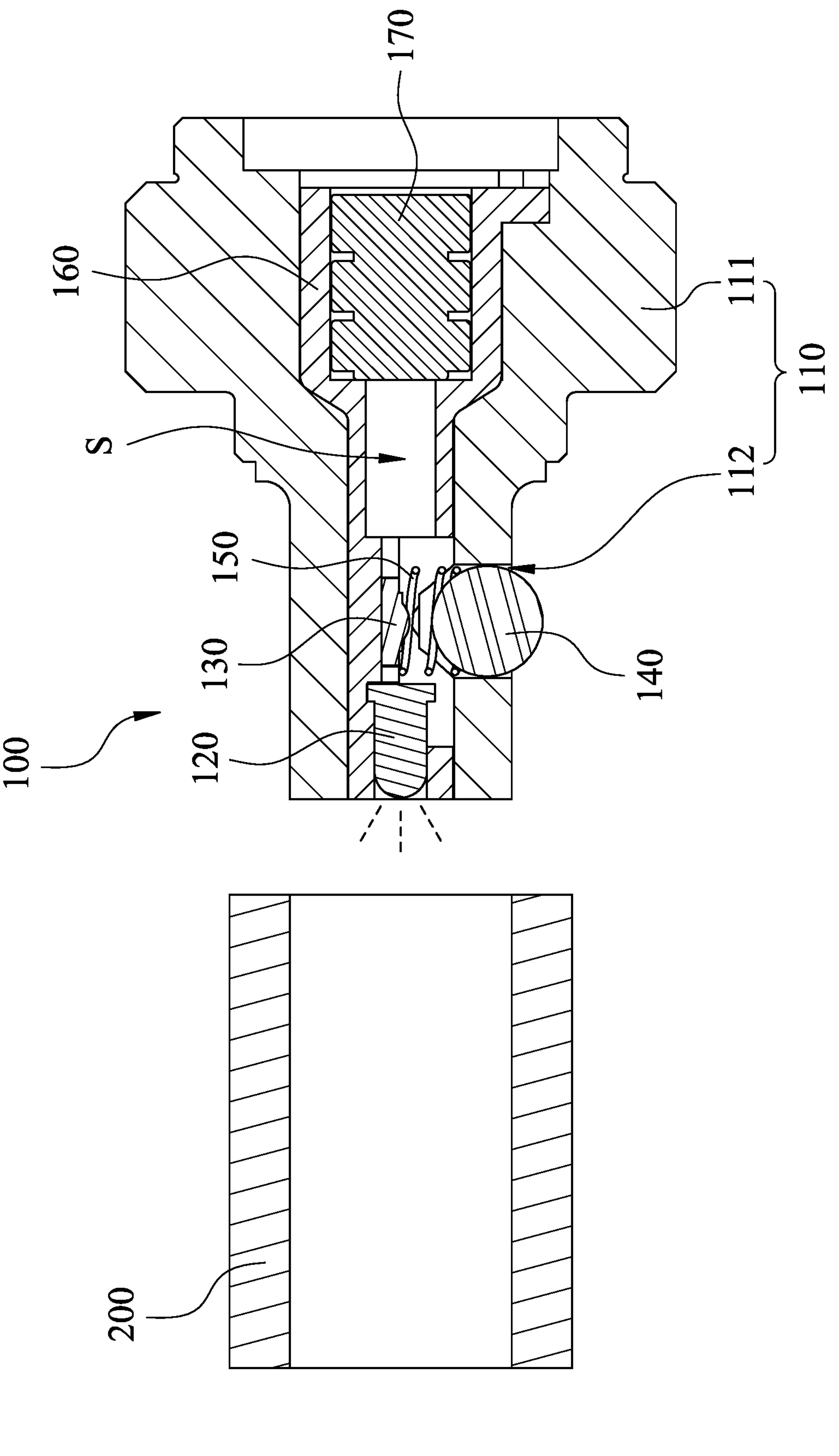
FIG. 3 is a sectional view of the socket-driven lighting connector according to the embodiment in FIG. 1, showing the socket-driven lighting connector ready to be connected with a socket.
Figure 4:
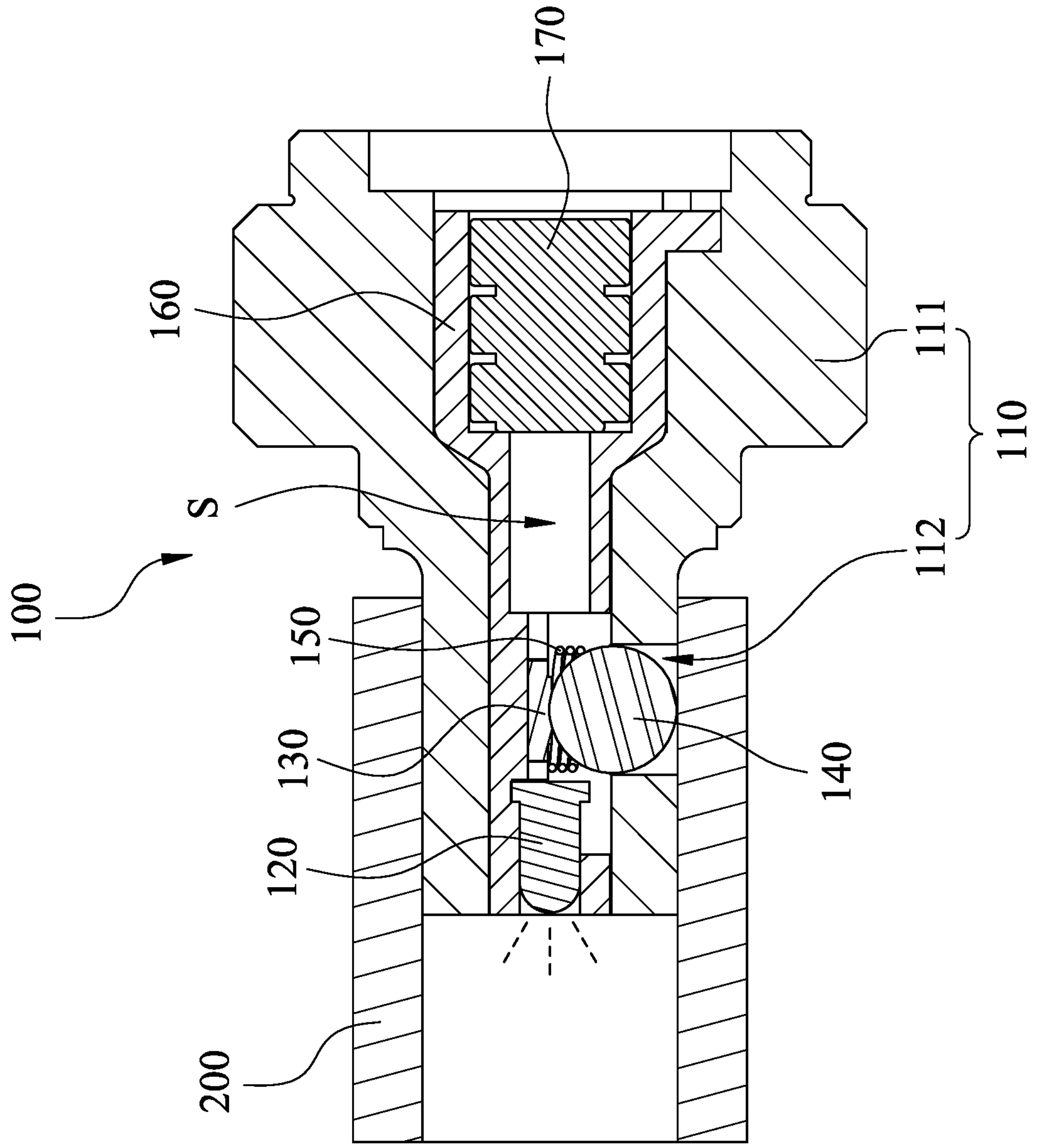
FIG. 4 is another sectional view of the socket-driven lighting connector according to the embodiment in FIG. 1, showing the socket-driven lighting connector connected with a socket.

Please refer to FIG. 1 for a perspective view of the socket-driven lighting connector 100 according to an embodiment of the present disclosure, and FIG. 2 for an exploded view of the socket-driven lighting connector 100 according to the embodiment in FIG. 1. The socket-driven lighting connector 100 is configured to connect with a socket 200 (see FIG. 3) and, as shown in FIG. 1 and FIG. 2, includes a connector main body 110, a light bulb 120, a switch 130, and a positioning ball 140. The connector main body 110 includes an enclosing wall 111 and a radial through hole 112. The enclosing wall 111 surrounds and forms a through space S. The radial through hole 112 penetrates the enclosing wall 111 and is in communication with the through space S. The light bulb 120 is disposed in the through space S. The switch 130 is provided in the through space S and is electrically connected to the light bulb 120. The positioning ball 140 is movably provided in the radial through hole 112. While the socket 200 is being mounted to the connector main body 110, the socket 200 pushes the positioning ball 140 and thereby switches the positioning ball 140 from a first position (as shown in FIG. 3) to a second position (as shown in FIG. 4). When at the second position, the positioning ball 140 not only is pressed against the socket 200 to keep the socket 200 in place, but also presses the switch 130 to turn on the light bulb 120.

One end of the socket-driven lighting connector 100 is configured to connect with a hand tool (not shown), and the opposite end of the socket-driven lighting connector 100 is configured to be mounted into the socket 200. The movement and pressing action of the positioning ball 140 allow the socket 200 to be connected with the socket-driven lighting connector 100 so that the hand tool can be used to drive the socket-driven lighting connector 100 and thereby rotate the socket 200. The socket-driven lighting connector 100 may further include a restoring element 150 that is disposed in the through space S and between the switch 130 and the positioning ball 140. The restoring element 150 is not compressed by the positioning ball 140 when the positioning ball 140 is at the first position. The restoring element 150 is subjected to, and hence compressed by, the force applied by the positioning ball 140 when the positioning ball 140 is subjected to an applied force and ends up at the second position. Once the force applied to the positioning ball 140 is removed, the restoring element 150 returns to its original state and thereby pushes the positioning ball 140 from the second position back to the first position. The restoring element 150 may be a spring or an elastomer; the present invention has no limitation in this regard.

The socket-driven lighting connector 100 may further include a circuit board 160, wherein the circuit board 160 is disposed in the through space S and is provided with the light bulb 120.

The socket-driven lighting connector 100 may further include a battery 170, wherein the battery 170 is disposed in the through space S and is provided on the circuit board 160. The circuit board 160 may include a tube portion and a cylinder port connected to the tube portion, with both the light bulb 120 and the switch 130 provided in the tube portion, and the battery 170 received in the cylinder portion. The light bulb 120, the switch 130, and the battery 170 are electrically connected. Once the switch 130 is pressed, the electricity stored in the battery 170 is delivered to the light bulb 120 in order for the light bulb 120 to emit light.

Please refer to FIG. 3 for a sectional view showing the socket-driven lighting connector 100 according to the embodiment in FIG. 1 ready to be connected with the socket 200, and FIG. 4 for a sectional view showing the socket-driven lighting connector 100 according to the embodiment in FIG. 1 connected with the socket 200. It can be seen in FIG. 3 that the positioning ball 140 is not in contact with the switch 130 when at the first position. However, when an operator presses the positioning ball 140 from outside the connector main body 110, or when the operator mounts the socket 200 on the socket-driven lighting connector 100 and thereby moves the positioning ball 140 to the second position, the positioning ball 140 will be subjected to an applied force and end up compressing the restoring element 150 and pressing the switch 130 to form a closed circuit that allows the light bulb 120 to emit light. In other words, the light bulb 120 emits light as soon as the socket 200 is mounted on the socket-driven lighting connector 100. This helps enhance the efficiency with which the socket 200 can be operated in the dark by the operator. Moreover, the socket-driven lighting connector 100 can be used as a flashlight, and in that case, an operator can make the socket-driven lighting connector 100 (or more particularly the light bulb 120) emit light by pressing the positioning ball 140 with a finger. It should be pointed out that in this embodiment, pressing the switch 130 results in electrical conduction, and the electrical conduction is terminated by the switch 130 returning to its original state. In other embodiments, however, the electrical conduction state may be switched each time the switch is pressed, regardless of whether the switch returns to its original state; the present invention has no limitation in this regard.

Figure 5:
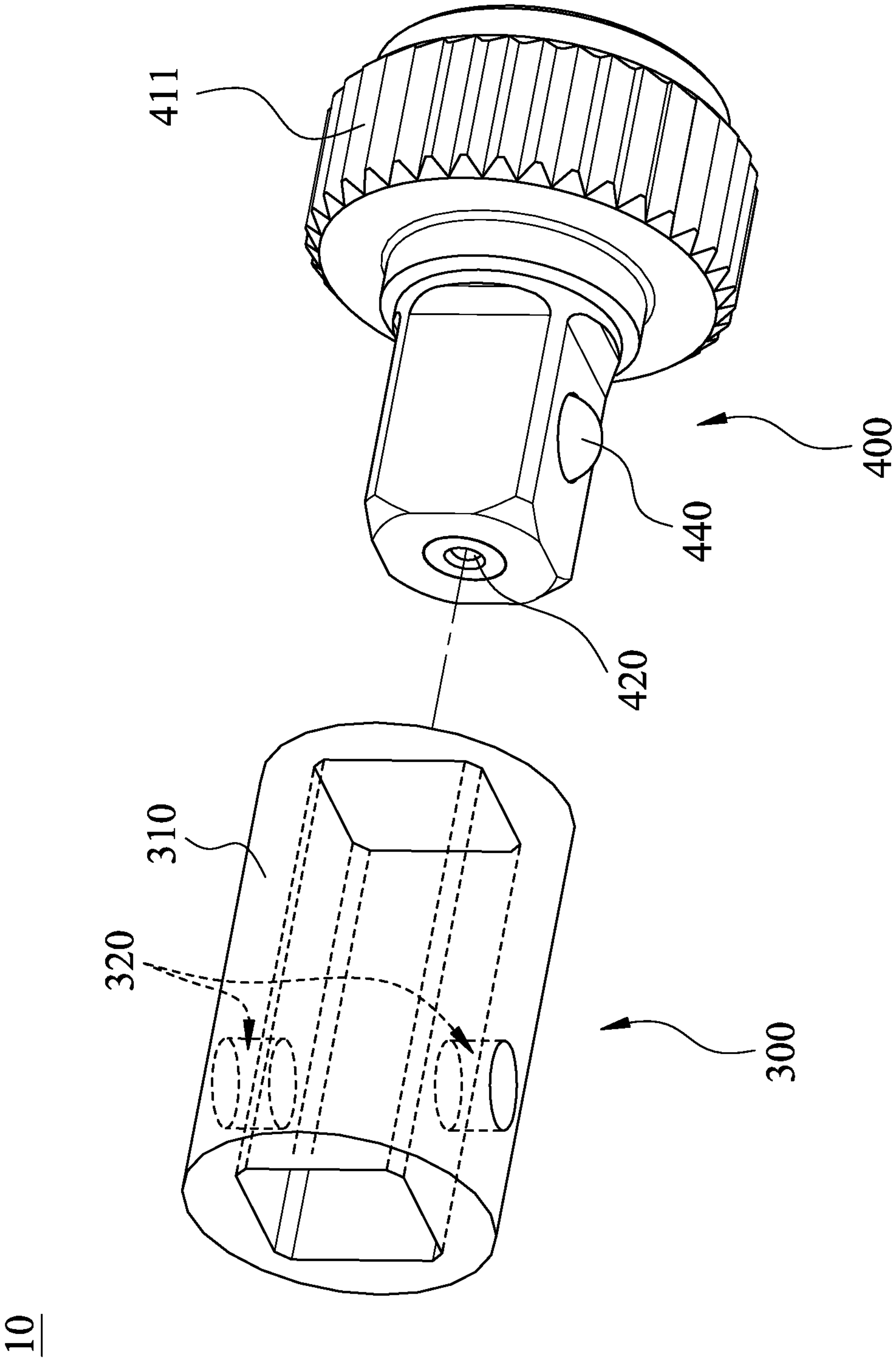
FIG. 5 is a perspective view of the socket-driven lighting device according to another embodiment of the present disclosure.
Figure 6:
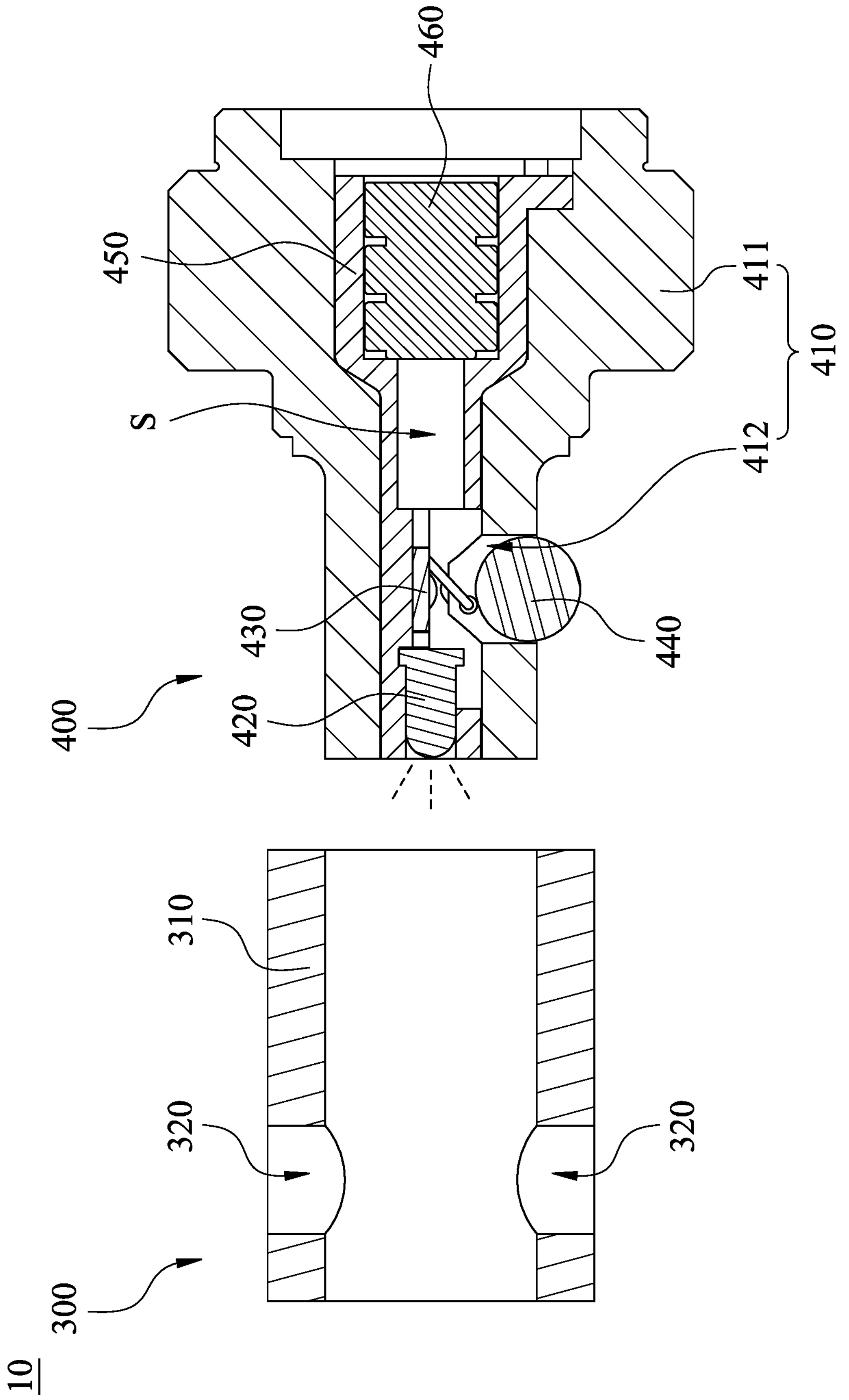
FIG. 6 is a sectional view of the socket-driven lighting device according to the embodiment in FIG. 5.

Please refer to FIG. 5 for a perspective view of the socket-driven lighting device 10 according to another embodiment of the present disclosure, and FIG. 6 for a sectional view of the socket-driven lighting device 10 according to the embodiment in FIG. 5. As shown in FIG. 5 and FIG. 6, the socket-driven lighting device 10 includes a socket 300 and a socket-driven lighting connector 400. The socket 300 includes an encircling wall 310 and at least one light-permeable portion 320 provided at the encircling wall 310. The socket-driven lighting connector 400 includes a connector main body 410, a light bulb 420, a switch 430, and a positioning ball 440. The connector main body 410 includes an enclosing wall 411 and a radial through hole 412. The enclosing wall 411 surrounds and forms a through space S. The radial through hole 412 penetrates the enclosing wall 411 and is in communication with the through space S. The light bulb 420 is disposed in the through space S. The switch 430 is provided in the through space S and is electrically connected to the light bulb 420. The positioning ball 440 is movably provided in the radial through hole 412. While the socket 300 is being mounted to the connector main body 410, the socket 300 pushes the positioning ball 440 and thereby switches the positioning ball 440 from a first position to a second position. When at the second position, the positioning ball 440 not only is pressed against the socket 300 to keep the socket 300 in place, but also presses the switch 430 to turn on the light bulb 420. The light of the light bulb 420 will come out of the socket 300 through the at least one light-permeable portion 320.

The number of the at least one light-permeable portion 320 may be two, and in that case, the two light-permeable portions 320 may be symmetrically disposed at the encircling wall 310. In addition, the at least one light-permeable portion 320 may be a through hole in communication with the interior of the socket 300, preferably corresponding in position to the light bulb 420. In other embodiments, the at least one light-permeable portion may be a physical structure made of a light-permeable material in order to allow passage of light. The present invention has no limitation on the configuration of the at least one light-permeable portion. The switch 430 in this embodiment has a microswitch structure so that when the positioning ball 440 is subjected to an applied force and hence pushes the push lever of the switch 430, an internal element of the switch 430 is driven to form a closed circuit that allows the light bulb 420 to emit light. Once the applied force is removed, a spring in the switch 430 restores the push lever, and consequently the positioning ball 440, to their respective original positions. In other words, in the embodiment shown in FIG. 5 and FIG. 6, there is no need to use an additional restoring element; the spring in the switch 430 will apply a restoring force to the positioning ball 440.

The socket-driven lighting connector 400 may further include a circuit board 450 and a battery 460, wherein the circuit board 450 is disposed in the through space S and is provided with the light bulb 420 while the battery 460 is disposed in the through space S and is provided on the circuit board 450. The circuit board 450 and the battery 460 are the same as the circuit board 160 and the battery 170 in the embodiment in FIG. 2 to FIG. 4 and therefore will not be described any further.

Figure 7:
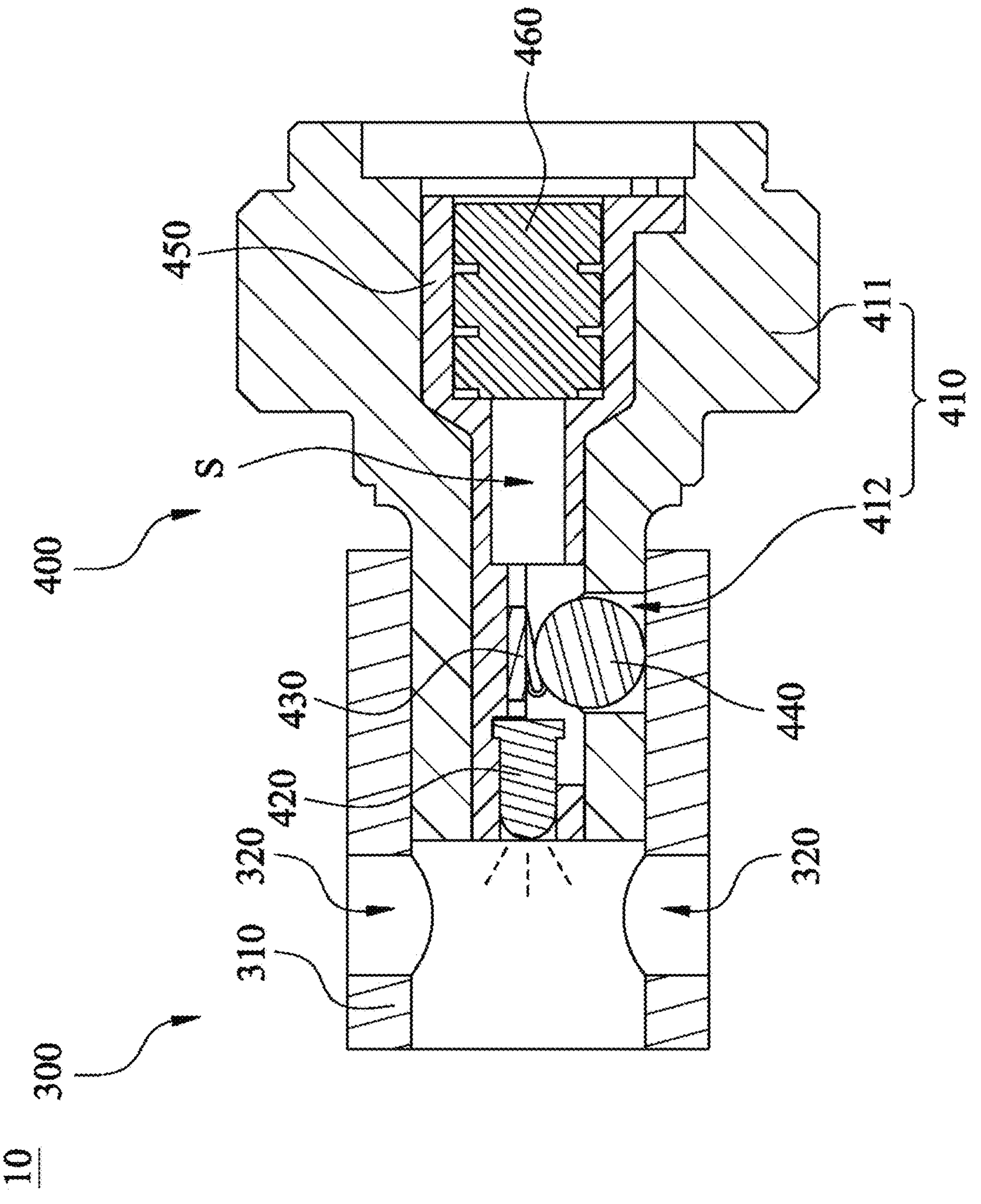
FIG. 7 is another sectional view of the socket-driven lighting device according to the embodiment in FIG. 5.

Please refer to FIG. 7 for another sectional view of the socket-driven lighting device 10 according to the embodiment in FIG. 5. It can be seen in FIG. 6 and FIG. 7 that the positioning ball 440 is not in contact with the switch 430 when at the first position (see FIG. 6), but when an operator presses the positioning ball 440 from outside the connector main body 410, or when the operator mounts the socket 300 on the socket-driven lighting connector 400 and thereby moves the positioning ball 440 to the second position (see FIG. 7), the positioning ball 440 will be subjected to an applied force and end up pressing the switch 430 to form a closed circuit that allows the light bulb 420 to emit light. In other words, the light bulb 420 emits light as soon as the socket 300 is mounted on the socket-driven lighting connector 400. This helps enhance the efficiency with which the socket 300 can be operated in the dark by the operator. Moreover, the socket-driven lighting connector 400 can be used as a flashlight, and in that case, an operator can make the socket-driven lighting connector 400 (or more particularly the light bulb 420) emit light by pressing the positioning ball 440 with a finger.

Figure 8:
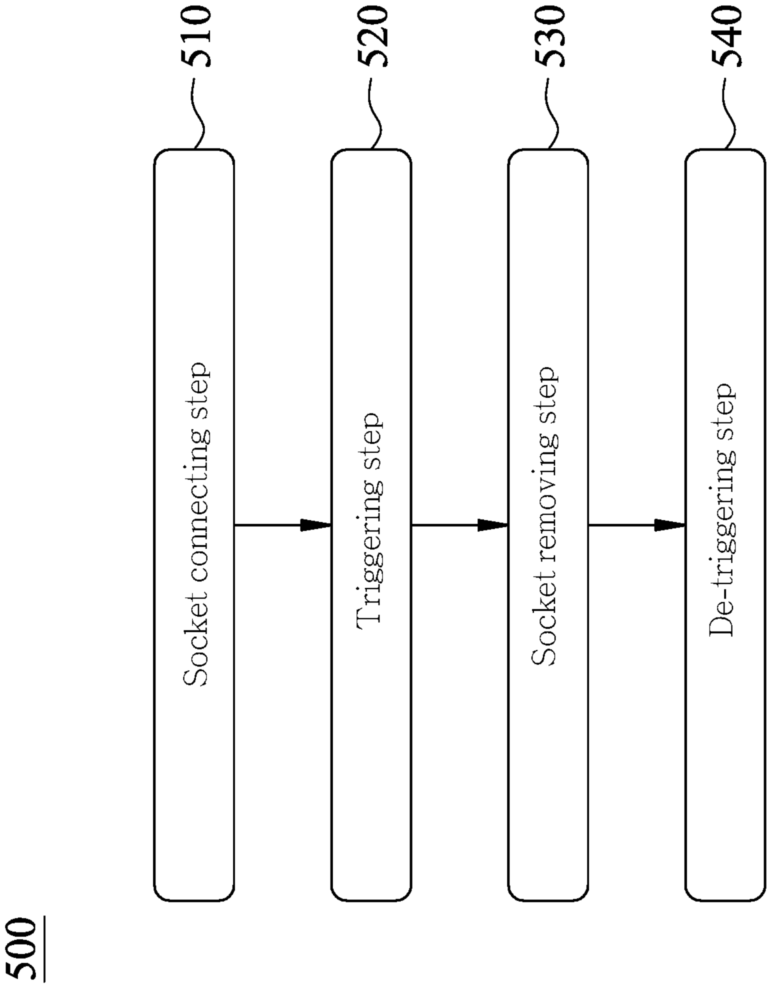
FIG. 8 is a flowchart of the operating method of a socket-driven lighting device according to still another embodiment of the present disclosure.

Please refer to FIG. 8 in conjunction with FIG. 5 to FIG. 7, wherein FIG. 8 is a flowchart of the operating method 500 of a socket-driven lighting device according to still another embodiment of the present disclosure. The details of the operating method 500 of a socket-driven lighting device will be described below with reference to the embodiment in FIG. 5 to FIG. 7. As shown in FIG. 5 to FIG. 8, the operating method 500 of a socket-driven lighting device includes a socket connecting step 510 and a triggering step 520. The socket connecting step 510 involves mounting the socket 300 on the connector main body 410 of the socket-driven lighting connector 400, wherein the socket-driven lighting connector 400, as stated above, includes the positioning ball 440, the light bulb 420, and the switch 430. The triggering step 520 involves pushing the positioning ball 440 with the socket 300 while the socket 300 is being mounted to the connector main body 410 so that the positioning ball 440 not only is pressed against the socket 300 to keep the socket 300 in place, but also presses the switch 430 and thereby causes the light bulb 420 to emit light.

More specifically, the socket-driven lighting connector 400 includes the connector main body 410, the positioning ball 440, the light bulb 420, and the switch 430, and in the course in which the socket 300 is mounted to the connector main body 410, the positioning ball 440 is pushed by the socket 300 and in turn presses the switch 430 to make the light bulb 420 emit light.

The operating method 500 of a socket-driven lighting device may further include a socket removing step 530 and a de-triggering step 540. The socket removing step 530 involves removing the socket 300 from the socket-driven lighting connector 400. The de-triggering step 540 involves restoring the positioning ball 440 to a position where it is not subjected to an applied force so that the light bulb 420 is turned off.

More specifically, while the socket 300 is being removed from the socket-driven lighting connector 400, the positioning ball 440 returns to the position where it is not subjected to an applied force, and the light bulb 420 is turned off as a result.

While the present disclosure makes reference to the foregoing embodiments, those embodiments are not intended to be restrictive of the scope of the present disclosure. A person of ordinary skill in the art will be able to change or modify the disclosed embodiments slightly without departing from the spirit or scope of the present disclosure. The scope of the patent protection sought by the applicant is defined by the appended claims.

What is claimed is:

1. A socket-driven lighting connector, configured to connect with a socket, the socket-driven lighting connector comprising:

a connector main body comprising:

an enclosing wall surrounding and forming a through space; and a radial through hole penetrating the enclosing wall and communicating with the through space;

a light bulb disposed in the through space;

a switch provided in the through space and electrically connected to the light bulb; and a positioning ball movably provided in the radial through hole;

wherein while the socket is being mounted to the connector main body, the socket pushes the positioning ball and thereby switches the positioning ball from a first position to a second position, and when at the second position, the positioning ball not only is pressed against the socket to keep the socket in place, but also presses the switch to turn on the light bulb.

2. The socket-driven lighting connector of claim 1, further comprising:

a restoring element disposed in the through hole and between the switch and the positioning ball.

3. The socket-driven lighting connector of claim 1, further comprising:

a circuit board disposed in the through space and provided with the light bulb.

4. The socket-driven lighting connector of claim 3, further comprising:

a battery disposed in the through space and provided on the circuit board.

5. A socket-driven lighting device, comprising:

a socket comprising:

an encircling wall; and at least one light-permeable portion provided at the encircling wall; and a socket-driven lighting connector configured to connect with the socket and comprising:

a connector main body comprising:

an enclosing wall surrounding and forming a through space; and a radial through hole penetrating the enclosing wall and communicating with the through space;

a light bulb disposed in the through space;

a switch provided in the through space and electrically connected to the light bulb; and a positioning ball movably provided in the radial through hole;

wherein while the socket is being mounted to the connector main body, the socket pushes the positioning ball and thereby switches the positioning ball from a first position to a second position, and when at the second position, the positioning ball not only is pressed against the socket to keep the socket in place, but also presses the switch to turn on the light bulb such that light of the light bulb comes out of the socket through the at least one light-permeable portion.

6. The socket-driven lighting device of claim 5, wherein the socket-driven lighting connector further comprises:

a restoring element disposed in the through hole and between the switch and the positioning ball.

7. The socket-driven lighting device of claim 5, wherein the socket-driven lighting connector further comprises:

a circuit board disposed in the through space and provided with the light bulb.

8. The socket-driven lighting device of claim 7, wherein the socket-driven lighting connector further comprises:

a battery disposed in the through space and provided on the circuit board.

9. An operating method of a socket-driven lighting device, comprising:

a socket connecting step comprising: mounting a socket on a socket-driven lighting connector, wherein the socket-driven lighting connector comprises a positioning ball, a light bulb, and a switch; and a triggering step comprising: pushing the positioning ball by the socket while the socket is being mounted to the connector main body, in order for the positioning ball to not only be pressed against the socket to keep the socket in place, but also press the switch and thereby cause the light bulb to emit light.

10. The operating method of a socket-driven lighting device as claimed in claim 9, further comprising:

a socket removing step comprising: removing the socket from the socket-driven lighting connector; and a de-triggering step comprising: restoring the positioning ball to a position where the positioning ball is not subjected to an applied force, thereby turning off the light bulb.

* * * * *